(12) United States Patent
Weaver et al.

(10) Patent No.: US 7,245,908 B1
(45) Date of Patent: Jul. 17, 2007

(54) METHOD AND ENTITY FOR PROCESSING COMMUNICATIONS BASED ON ALTITUDE

(75) Inventors: Farni Weaver, Spring Hill, KS (US); Piyush Jethwa, Overland Park, KS (US); Jesse Grindeland, Olathe, KS (US); Alex Zhang, Overland Park, KS (US); Wen Xue, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 777 days.

(21) Appl. No.: 10/465,442

(22) Filed: Jun. 19, 2003

(51) Int. Cl.
*H04Q 7/20* (2006.01)

(52) U.S. Cl. .................. 455/430; 455/456; 455/452; 455/562; 455/440

(58) Field of Classification Search ............ 455/431, 455/430, 456, 552, 562, 440
See application file for complete search history.

(56) References Cited

U.S. PATENT DOCUMENTS

| | | | |
|---|---|---|---|
| 6,408,180 B1 * | 6/2002 | McKenna et al. | 455/431 |
| 6,788,935 B1 * | 9/2004 | McKenna et al. | 455/431 |
| 6,999,780 B1 * | 2/2006 | Zhao | 455/456.5 |
| 2005/0272447 A1 * | 12/2005 | Eckel | 455/456.6 |

OTHER PUBLICATIONS

TR-45: "Enhanced Wireless TIA/EIA/J-STD-036-A 9-1-1 Phase 2", TIA/EIA/J-STD-036-A, Telecommunications Industry Association (TIA), 2002.
TR-45: "Position Determination Service Standard For Dual-Mode Spread Spectrum Systems", TIA/EIA/IS-801, Telecommunications Industry Association (TIA), 1999.

* cited by examiner

*Primary Examiner*—Creighton Smith (57) ABSTRACT

A method and system for processing communications based on altitude is provided. When a network receives a request to connect a communication to or from a mobile station, the network will determine the mobile station's current altitude. The network can make this determination by acquiring a GPS reading of the mobile station's current location, which can include an indication of altitude as well as latitude and longitude. Based at least in part on the altitude, the network can then decide whether to allow the requested communication to proceed. For instance, if the altitude is greater than a predetermined threshold level, then the network may preclude the communication. A network can also take into consideration other factors in addition to the altitude of a mobile station, such as the latitude and longitude coordinates of the mobile station, in deciding whether to allow a requested communication to proceed.

25 Claims, 8 Drawing Sheets

METHOD AND ENTITY FOR PROCESSING COMMUNICATIONS BASED ON ALTITUDE

FIELD OF INVENTION

The present invention relates to wireless communications, and more particularly, to a mechanism for processing network communications based on the altitude of a communicating device.

BACKGROUND

Cellular wireless is an increasingly popular means of personal communication in the modern world. People are using cellular wireless networks for the exchange of voice and data over cellular telephones, Personal Digital Assistants (PDAs), cellular telephone modems, and other devices. In principle, a user can seek information over the Internet or call anyone over a Public Switched Telephone Network (PSTN) from any place inside the coverage area of the cellular wireless network.

The widespread use of cell phones, and other mobile stations, however, can create havoc on the cellular wireless network if their use is unmonitored. As such, cell phone usage, and other mobile station usage, has been limited in some situations. For example, cellular phone use on an airplane is limited because it can interfere with the cellular telephone network. From an airplane a cell phone can connect to nearly any cell in view below, causing much turmoil, especially with a jet traveling 500 miles an hour, passing by one cell after another far more quickly than the networks were designed to handle. A cell phone could possibly register with 30–50 base stations at once since the airplane travels so fast, which exhausts processing power and interferes with ground-based transmissions. Since there are thousands of passengers every day, likely cell phone usage by these passengers would thus bog down the network, resulting in numerous busy signals. In addition, use of cellular phones in an airplane may interfere with the sensitive aircraft instruments and with wireless communications to and from airplanes.

Furthermore, use of cell phones in certain areas can be undesirable for any number of other reasons. For example, use of cell phones within hospitals can cause undesirable interference with sensitive equipment. Consequently, for many reasons, it would be desirable to limit cell phone use, and other mobile station use, under certain circumstances.

SUMMARY

According to an exemplary embodiment, a method for processing wireless communications is provided. The method includes receiving a request to connect a communication for a mobile station, and determining the mobile station's altitude. The method further includes, based at least in part on the mobile station's altitude, processing the request. For example, if the mobile station is above a threshold altitude level, then the request may be denied. The altitude of the mobile station can be considered an elevation or height of the mobile station relative to height above sea level, or with respect to other references as well.

In another respect, the exemplary embodiment may take the form of a method for processing wireless communications after establishing a connection between a mobile station and a device. The method includes determining the mobile station's altitude and, based at least in part on the mobile station's altitude, deciding whether to maintain the connection between the mobile station and the device. The mobile station's altitude can be determined continually or periodically by acquiring a Global Positioning System (GPS) reading of the mobile station's altitude, for example.

In still another respect, the exemplary embodiment may take the form of an entity for controlling wireless communications. The entity may include service logic that is able to request information to determine a mobile station's altitude. The entity may also include a processor that is able to process a request to connect a communication for the mobile station based at least in part on the mobile station's altitude. The entity may be a mobile switching center (MSC), a service control point (SCP), the mobile station, or another entity, for example.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, wherein elements that have the same reference numeral designations represent like elements throughout and wherein.

DETAILED DESCRIPTION OF EXEMPLARY EMBODIMENTS

The present invention provides a mechanism for controlling network communications based at least in part on the altitude of a communicating station.

In accordance with an exemplary embodiment of the invention, when a network receives a request to connect a communication to or from a mobile station, the network will determine the mobile station's current altitude. The network can make this determination by acquiring a GPS reading of the mobile station's current location, which can include an indication of altitude as well as latitude and longitude. Based at least in part on the altitude, the network can then decide whether or not to allow the requested communication to proceed. For instance, if the altitude is greater than a predetermined threshold level, then the network may preclude the communication.

In another embodiment, the mobile station itself could determine its current altitude when the mobile station receives a request to connect a communication for the mobile station, e.g., when the mobile station receives a call or when a user of the mobile station desires to begin a call. And based on its altitude, the mobile station could process the request. For example, the mobile station could determine whether or not to allow the requested communication to proceed.

The communications within a wireless network may be voice communications or data communications. Therefore, voice and/or data calls can be subject to any call restrictions that depend on the altitude of an intended recipient mobile station or the altitude of an originating mobile station.

As a specific example, a wireless service provider's switch may receive an origination request from a mobile station and may signal to a service control point (SCP) for call processing assistance. The SCP may then query a location-determination system, such as a mobile positioning center (MPC), to determine the mobile station's current location, including at least an indication of the mobile station's current altitude. Based on the altitude, the SCP may then apply service logic to determine whether to allow the call to proceed, and the SCP may accordingly instruct the switch. A similar process could occur when a switch receives a request to connect a call to a mobile station.

Note that a wireless service provider can also take into consideration other factors in addition to the altitude of a mobile station, in deciding whether to allow a requested communication to proceed. For instance, the wireless service provider can consider both latitude and longitude coordinates of the mobile station and altitude of the mobile station. Other examples are possible as well.

Advantageously, the exemplary embodiment can be applied to preclude mobile station users from engaging in wireless communications while in an airplane that is in flight. Although this might not preclude all wireless communications (e.g., control channel communications), it can go a long way to help ensure compliance with regulations that preclude use of mobile phone technology in flight.

Wireless Network Architecture

Figure 1:
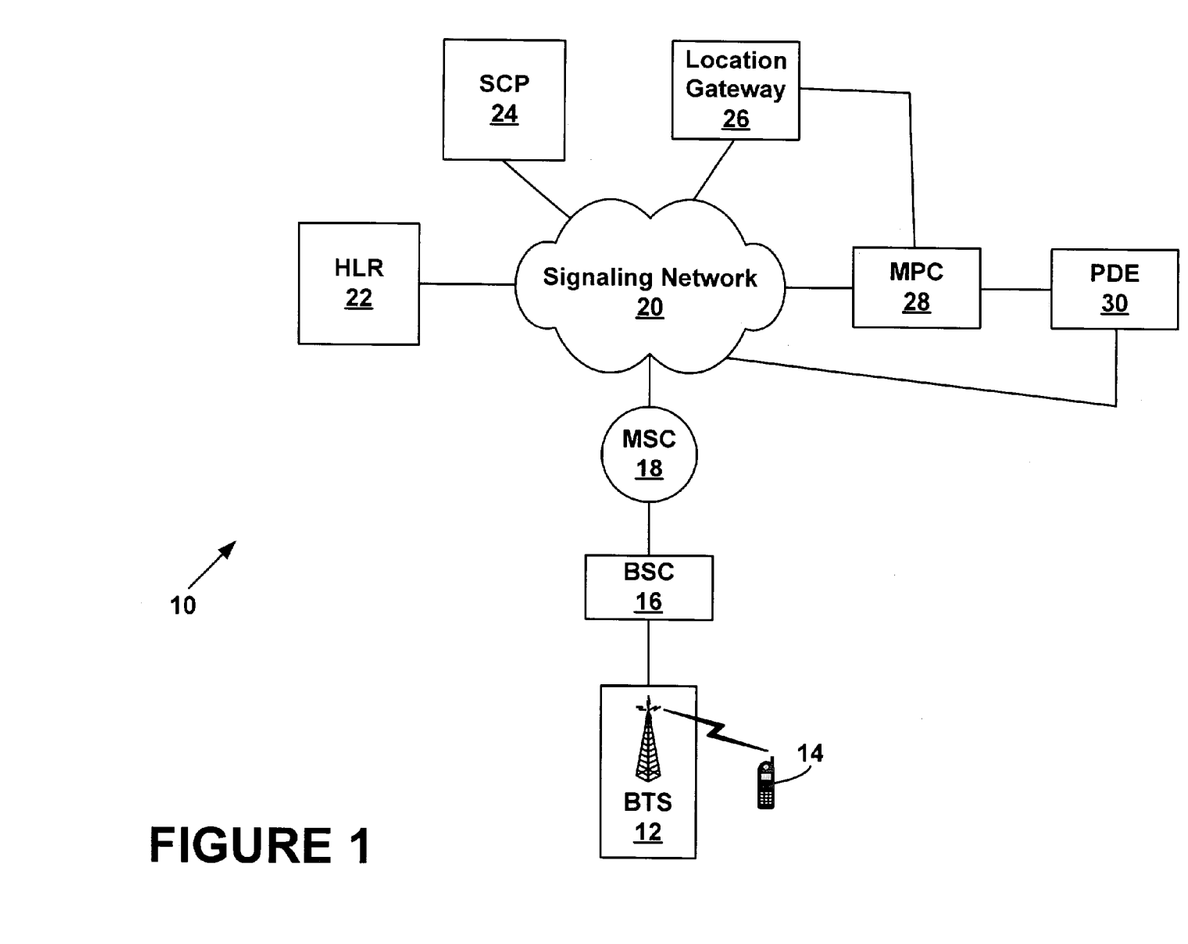
FIG. 1 is a block diagram illustrating one embodiment of a wireless communication network.

Referring now to the figures, FIG. 1 is a block diagram illustrating one embodiment of a wireless communication network 10. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

The network 10 includes a base transceiver station (BTS) 12 that provides a wireless coverage area within which the BTS 12 may communicate with one or more mobile stations, such as mobile station 14, over an air interface. Mobile station 14 may be a wireless telephone, a wirelessly-equipped personal digital assistant (PDA), or other wireless communication device. The communications between the BTS 12 and the mobile station 14 may occur in a digital format, such as code division multiple access (CDMA), time division multiple access (TDMA), global standard for mobile communications (GSM), or 802.11x, or they may occur in an analog format, such as advanced mobile phone system (AMPS). One exemplary wireless communications format is "CDMA 2000," such as described in EIA/TIA/IS-2000 Series, Rev. A (published March 2000), which is fully incorporated herein by reference.

The BTS 12 is controlled by a base station controller (BSC) 16, which, in turn, is controlled by a mobile switching center (MSC) 18. The BSC 16 may be responsible for controlling power levels and frequency allocation for the air interface between the BTS 12 and the mobile station 14.

The MSC 18 is connected to a signaling network 20, which may be associated with a circuit switched network, such as a public switched telephone network (PSTN), and the MSC 18 can then use an out-of-band signaling system, such as Signaling System 7 (SS7) in the signaling network 20 to route calls through the circuit switched network. Alternatively, the signaling network may be a packet switched network, such as the Internet, which routes packets using a network protocol.

The MSC 18 is able to signal through the signaling network 20 to a home location register (HLR) 22, which defines services and features authorized for use by particular mobile subscribers, and to an SCP 24. The wireless communication network 10 may also include an Integrated Service Control Point (ISCP), not shown, in addition to or rather than the SCP 24. The signaling between the MSC 18 and the HLR 22 and SCP 24 may occur via one or more signal transfer points (STPs). The signaling between the MSC 18 and the HLR 22 may conform to Interim Standard 41 (IS-41) specifications, published by the Telecommunication Industry Association, which is fully incorporated herein by reference. The signaling between the MSC 18 and the SCP 24 may conform to the specification "Wireless Intelligent Network," TIA/EIA/IS-771, published in July 1999, which is fully incorporated herein by reference. However, other signaling protocols could be used.

The MSC 18, BSC 16 and BTS 12 may connect calls from the signaling network 20, which calls may originate from calling parties using landline telephones, mobile stations, or other communication devices, to the mobile station 14. Similarly, the MSC 18, BSC 16, and BTS 12 may connect calls originating from the mobile station 14 to their destinations, via the signaling network 20.

In one instance, the MSC 18 may signal the mobile station 14 according to the specification "Position Determination Service Standard for Dual Mode Spread Spectrum Systems," TIA/EIA/IS-801, published in October 1999 and fully incorporated herein by reference, which defines a set of signaling messages between the mobile station and the BTS/BSC/MSC to provide a position determination service.

The MSC 18 is programmed with a set of service logic that causes the MSC 18 to query the SCP 24 at predefined "trigger points" during call processing (as described in IS-771), providing the SCP 24 with parameters such as an identification of the calling and called parties, for example. When the SCP 24 receives the query message, the SCP 24 may execute an appropriate set of service logic or consult appropriate databases to obtain information and instructions needed to provide a special service to the call. In turn, the SCP 24 may return a response message to the MSC 18, instructing the MSC 18 how to handle the call.

The signaling network 20 may also carry communications related to determining and reporting locations of mobile stations, such as mobile station 14. In this regard, the wireless communication network 10 may include a location gateway 26, communicatively coupled to the signaling network 20. The location gateway 26 may manage the process of obtaining and reporting mobile station location information.

The signaling network 20 also couples to an MPC 28, which is communicatively coupled to the location gateway 26 through an IP network (not shown). The MPC 28 also couples to a position determining entity (PDE) 30. Multiple PDEs may serve the coverage area of an MPC. Therefore, the MPC 28 selects a PDE, such as PDE 30, to determine the position of a mobile station. The PDE 30 may reside within many entities, which couple to the MPC 28. Thus, PDE 30 may be able to communicate with mobile stations, such as the mobile station 14, to determine the locations of the mobile stations and to convey this information to the MPC 28. The mobile station itself may also function as a PDE and communicate with MPC 28 to convey its location.

Signaling between the MPC 28 and PDE 30, and between the MPC 28 and the MSC 18 to determine mobile station location information may conform to the TIA/EIA/J-STD-036 (Telecommunications Industry Association/Electronics Industry Alliance), entitled "Enhanced Wireless 911, Phase 2," published in August 2000, and revised in March 2002, and which is fully incorporated herein by reference.

As one example outlined in J-STD-036, the Location Services Protocol (LSP) may be used for signaling between the MPC 28 and PDE 30 and is applicable to AMPS, TDMA and CDMA air interfaces. A GeoPositionRequest (GPOSREQ) message may be sent by the MPC 28 to the PDE 30 to ask the PDE 30 for an initial, updated or last known position of a mobile station. Position information may then be sent from the PDE 30 to the MPC 28 using a GeoPositionDirective (GPOSDIR) message. Further, a Short Message Delivery Point To Point (SMDPP) message can be used to transfer position information from the MPC 28 to the MSC 18.

Figure 2:
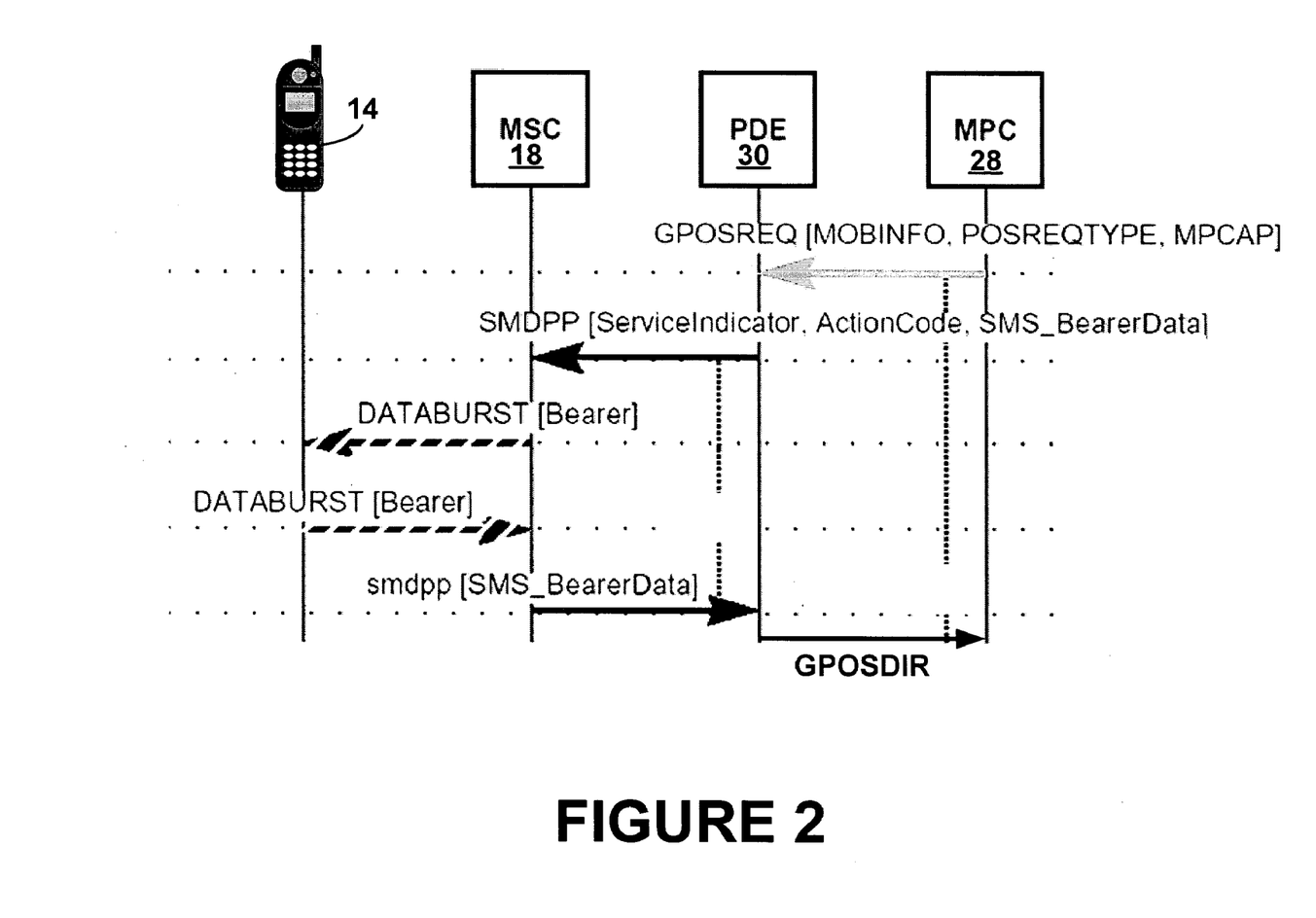
FIG. 2 is a message flow diagram illustrating one example of signaling within the wireless communication network to determine position information.

FIG. 2 illustrates one specific example of signaling within the network 10 to determine position information. When the MPC 28 requests position information from the PDE 30, the MPC 28 will send a position request message to the PDE 30, which indicates the mobile station's position capabilities. The position request message may be a GPOSREQ message, for example. The GPOSREQ may include mobile information (MobInfo), POSREQTYPE (request type), and an MPCAP parameter (mobile station position capability).

The PDE 30 then initiates an SMDPP message to the MSC 18, containing parameters such as a ServiceIndicator (to indicate the type of service requested such as a position determination service), an ActionCode (to specify the nature of the action to be performed by the PDE), an SMS_BearerData (e.g., including information pertaining to the mobile station), and others. The PDE 30 encapsulates in the SMS_BearerData parameter an action according to the value of the MPCAP parameter and the procedures defined in IS-801. The ServiceIndicator parameter may identify this as handset assisted position information (described more fully below). The MSC 18 will receive the SMDPP message and send a databurst message to the mobile station containing the bearer data from the SMDPP message including the positioning related information. The mobile station returns a response containing the positioning related information (e.g., IS-801 information) in a databurst message to the MSC 18. The MSC 18 sends the mobile station-provided positioning related information in an SMDPP response message to the PDE 30. The PDE 30 uses the received information to determine the mobile station's position and sends a response to the MPC 28 (e.g., a GPOSDIR response message).

Controlling Communications Based on Altitude

Figure 3:
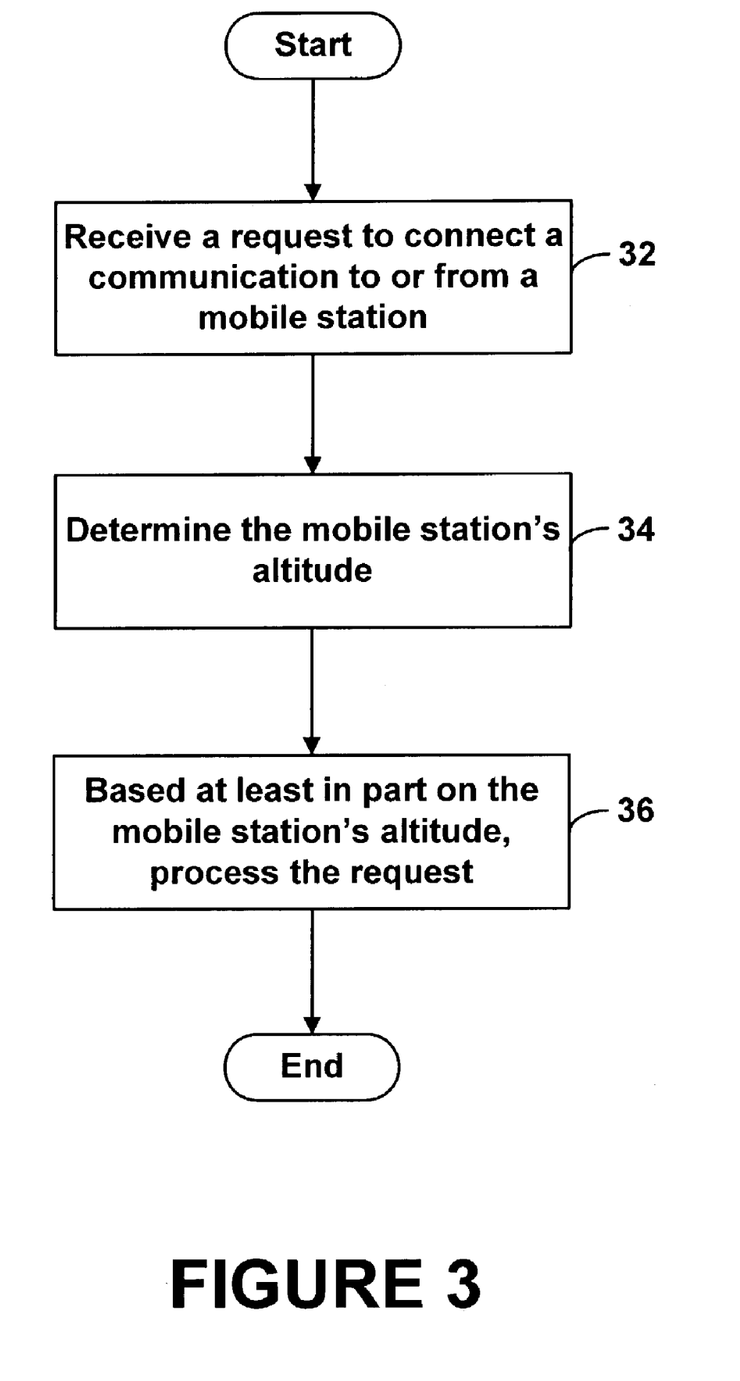
FIG. 3 is a flowchart depicting functional blocks of a method of processing wireless communications according to one embodiment.

FIG. 3 is a flowchart depicting functional blocks of an exemplary embodiment of the invention. When the wireless communication network 10 receives a request to connect a communication to or from mobile station 14, as shown at block 32, the network 10 will determine the mobile station's current altitude, as shown at block 34. The request may occur when the mobile station 14 initiates a call or receives a call. Based at least in part on the altitude, the network 10 can then process the request, as shown at block 36, such as by deciding whether or not to allow the requested communication to proceed. For instance, if the altitude is greater than a predetermined threshold level, then the network 10 may preclude the communication.

Detect Communication Request

Figure 4:
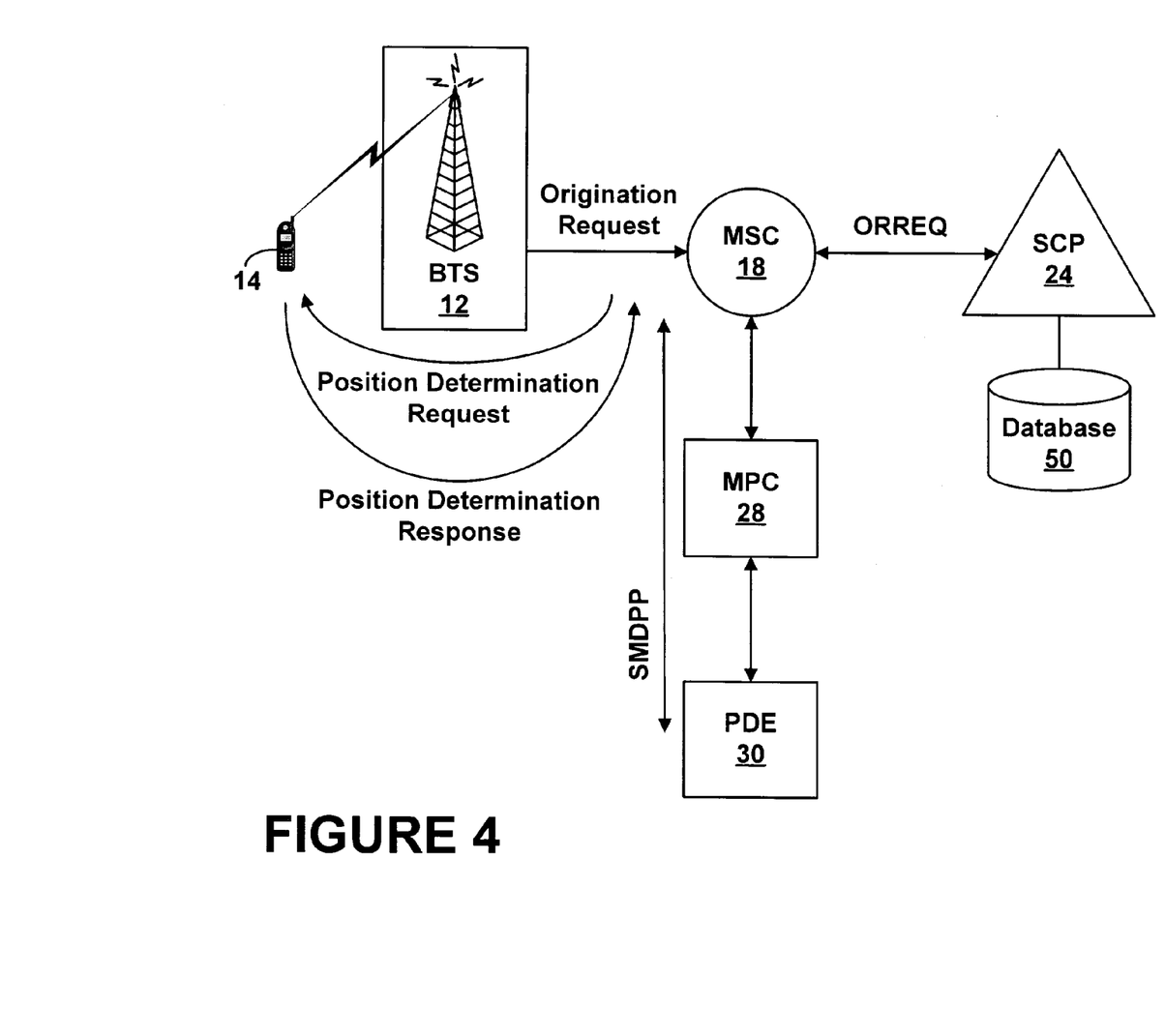
FIG. 4 is a block diagram illustrating one example of communications within the wireless communication network.

FIG. 4 illustrates one example of communications within the wireless communication network 10 according to the exemplary embodiment of the invention. The MSC 18 may receive an origination request from the mobile station 14 to begin a call or may receive an origination request to connect a call to mobile station 14. The MSC 18 may then process the request. The MSC 18 detects events (triggers) at various points where call processing can be interrupted to request further instructions (e.g., at origination or completion of dialing).

After detecting a trigger, the MSC 18 then queries the SCP 24 for further instructions. The MSC 18 may send an origination request invoke message (i.e., an origination request (ORREQ) message as defined in IS-771) to the SCP 24. The ORREQ message is used to request call origination treatment on behalf of a registered mobile station. The ORREQ message may include parameters such as the MIN (mobile station identification number) and ESN (electronic serial number) of the mobile station, an identifier of the serving MSC (e.g., MSCID), the digits entered by the mobile station which identify the called party (e.g., DGTSDIAL), an origination trigger to invoke the operation (e.g., ORIGTRIG) and others. The ORREQ may include as much information as is known at the current state of the call so that service logic in the SCP 24 can use the information.

When the SCP 24 receives the ORREQ message, the SCP 24 may execute an appropriate set of service logic or consult appropriate databases to obtain information and instructions needed to provide a special service to the call. For example, the SCP 24 can query the MPC 28 to determine both the originating and terminating mobile stations' altitudes. The SCP 24 may send an ORREQ response message to the MSC 18, which then signals the MPC 28 using a SMDDP message (described more fully below). The MPC 28 will the query the PDE 30 to determine a mobile station's altitude. In turn, the MPC 28 can return a response message to the SCP 24, which then may return a response message to the MSC 18, instructing the MSC 18 how to handle the call.

Determining Mobile Station Altitude

The PDE 30 may determine the mobile station's altitude by signaling the mobile station 14 according to the ANSI-41 protocol, as described in J-STD-036. For example, the PDE 30 may send an SMDDP message through the MPC 28 to the MSC 18. The SMDDP may contain the specific MIN of the mobile station 14. The MSC 18 may then signal the mobile station 14 according to TLA/EIA/IS-801, using a position determination request message. The mobile station 14 will return its location information, including its current altitude, to the MSC 18 using a position determination response message. In turn, the MSC 18 will send this location information back to the PDE 30 using an SMDDP message.

The same signaling may also apply to the other communicating device, which either originated a call to the mobile station 14 or to which mobile station 14 is attempting to call, to determine its operating altitude.

In one embodiment, the PDE 30 determines the mobile station's altitude by acquiring a GPS reading of the mobile station's current location, which can include an indication of altitude as well as latitude and longitude. In this regard, the mobile station 14 may include a GPS receiver, and may autonomously determine its location. The mobile station 14 may simply send to the PDE 30 or other network element its calculated location, e.g., its latitude, longitude and altitude. The mobile station 14 may relay this information to the PDE 30 either upon initiation of a call, termination of a call, or periodically to update the PDE's 30 knowledge of the location of the mobile station 14. In addition, the mobile station 14 may relay this information to the PDE 30 in response to a specific request for this information. For example, as explained above, the PDE 30 may signal the mobile station 14, through the MPC 28 and MSC 18, requesting the mobile station's altitude and the mobile station 14 may respond by sending a position determination response message to the MSC 18, which relays this information through an SMDPP message to the PDE 30.

In another embodiment, wireless assisted GPS is used to determine the location, including the altitude, of the mobile station 14. In the wireless assisted GPS approach, the mobile station 14 includes a GPS receiver but does not determine its location on its own. Instead, the MPC 28 or PDE 30, determines the location of mobile station 14, in terms of latitude, longitude and altitude, based at least in part on information provided by the mobile station 14. For example, the mobile station 14 may first send its approximate location, such as the cell or sector of a BTS it is operating in, to the PDE 30. Using this approximate location, the PDE 30 determines what GPS satellites are in view of the cell or sector and their Doppler offsets and then sends this information to the mobile station 14 as "assistance data." The mobile station 14 then uses this assistance data to acquire GPS signals from the GPS satellites and, thereby, obtains information, such as pseudoranges, from which its location may be calculated. The mobile station 14 sends the pseudoranges and/or other location-related information to the PDE 30. The PDE 30 then calculates the location of the mobile station 14, such as in terms of latitude, longitude and altitude, based on the information from the mobile station 14 and, optionally, various corrections.

However, other techniques for determining the location of the mobile station 14 may be used. For example, location technologies that do not rely on GPS may be used to determine the location of the mobile station 14, such as by performing a time/frequency analysis on incoming signals received at the BTS 12.

Processing Communication Requests Based on the Mobile Station's Altitude

After receiving the location information, including the current altitude of the mobile station 14, the PDE 30 will forward this information to the SCP 24, possibly through an SMDPP message to the MSC 18 and then through an ORREQ message to the SCP 24. Based on the mobile station's current altitude, a processor within the SCP 24 may apply service logic to determine whether to allow the call to proceed, and the SCP 24 may accordingly instruct the MSC 18.

Other entities within the wireless communication network 10 may also make the determination of whether to allow the call to proceed, and these entities may include service logic that can receive the mobile station's altitude information and a processor to make the determination. For example, the location gateway 26 may receive the altitude information and make the decision itself, and then instruct the SCP 24 how to handle the call. In addition, the SCP 24 may forward the altitude information to the MSC 18, which can make the determination of whether to allow the call to proceed. Furthermore, an ISCP, the MPC 28, or the PDE 30 could make the determination after receiving the altitude information. An application may reside in any entity within the network 10 that has access to altitude information, either directly or indirectly, and may be executed to determine whether to allow the call to proceed. For example, a third party application may reside in an entity that is coupled to the location gateway 26, MSC 18, or SCP 24 and, therefore may receive the altitude information and accordingly make the determination of whether to allow the call to proceed. In addition, if the mobile station 14 has the capability to autonomously determine its altitude, the mobile station 14 itself may then determine whether to allow the call to proceed. For example, if the mobile station 14 includes a GPS receiver, the mobile station 14 can determine its altitude and then determine whether to allow a user to initiate a call or whether to allow a received communication to proceed. Other examples are possible as well.

The SCP 24, or other entity making the decision, may allow the call to proceed if the mobile station's current altitude is above or below a predetermined threshold value. Alternatively, the SCP 24 may allow the call to proceed if the mobile station's current altitude is within a range of altitudes. The SCP 24 may access a database 50 (illustrated in FIG. 4), which may be separate from the SCP 24 or may be an entity within the SCP 24, to determine the altitude levels for which calls to or from the mobile station 14 are prohibited. Other entities capable of making the determination also may have access to a database, either directly or indirectly. The database 50 may include information pertaining to individual mobile stations, indicating the altitudes that those mobile stations may operate. In this manner, certain mobile stations may be allowed to operate at higher altitudes and certain mobile stations could be prohibited from operating at those altitudes. In any event, use of the wireless communication network 10 by mobile stations operating at high altitudes, such as within airplanes, could be managed so that interference with sensitive electronic equipment is minimized.

The database 50 may alternatively contain altitude threshold values to be applied to all mobile stations operating within the wireless communication network 10. In this manner, no mobile stations may operate at high altitudes, for example.

If the SCP 24 determines that the communication should be prohibited, the SCP 24 informs the MSC 18. (If another entity makes the decision of whether to allow a communication to proceed, then the entity may take appropriate action to instruct the MSC 18 how to handle the call). In turn, the MSC 18 may simply preclude a connection from being established between the mobile station 14 and the other device. If the mobile station 14 originated the call request and the mobile station is above an operating altitude, the MSC 18 may return a busy signal to the other device, or an error message could be sent to the other device to indicate that the mobile station 14 is out of a range of allowable altitude levels.

As one illustrative example, the exemplary embodiment can be applied to preclude mobile station users from engaging in wireless communications while in an airplane that is in-flight. In this example, the SCP 24 would allow a call to proceed if the mobile station's current altitude was below a threshold value, such as below a typical in flight altitude of an airplane, e.g., 12,000 meters. Although this might not preclude all wireless communications (e.g., communications from the mobile station 14 to the MSC 18, such as an origination message), it can go a long way to help ensure compliance with regulations that preclude use of the mobile phone 14 technology in flight. However, if the mobile station 14 itself could make the determination of whether to allow the call to proceed, then all wireless communications, except the communications necessary for the mobile station 14 to determine its altitude, could be precluded. In both examples, disruption in the network 10 that arises from the mobile station 14 being in communication with many ground-based cell towers, such as BTS 12, at the same time, could be lessened.

Figure 5:
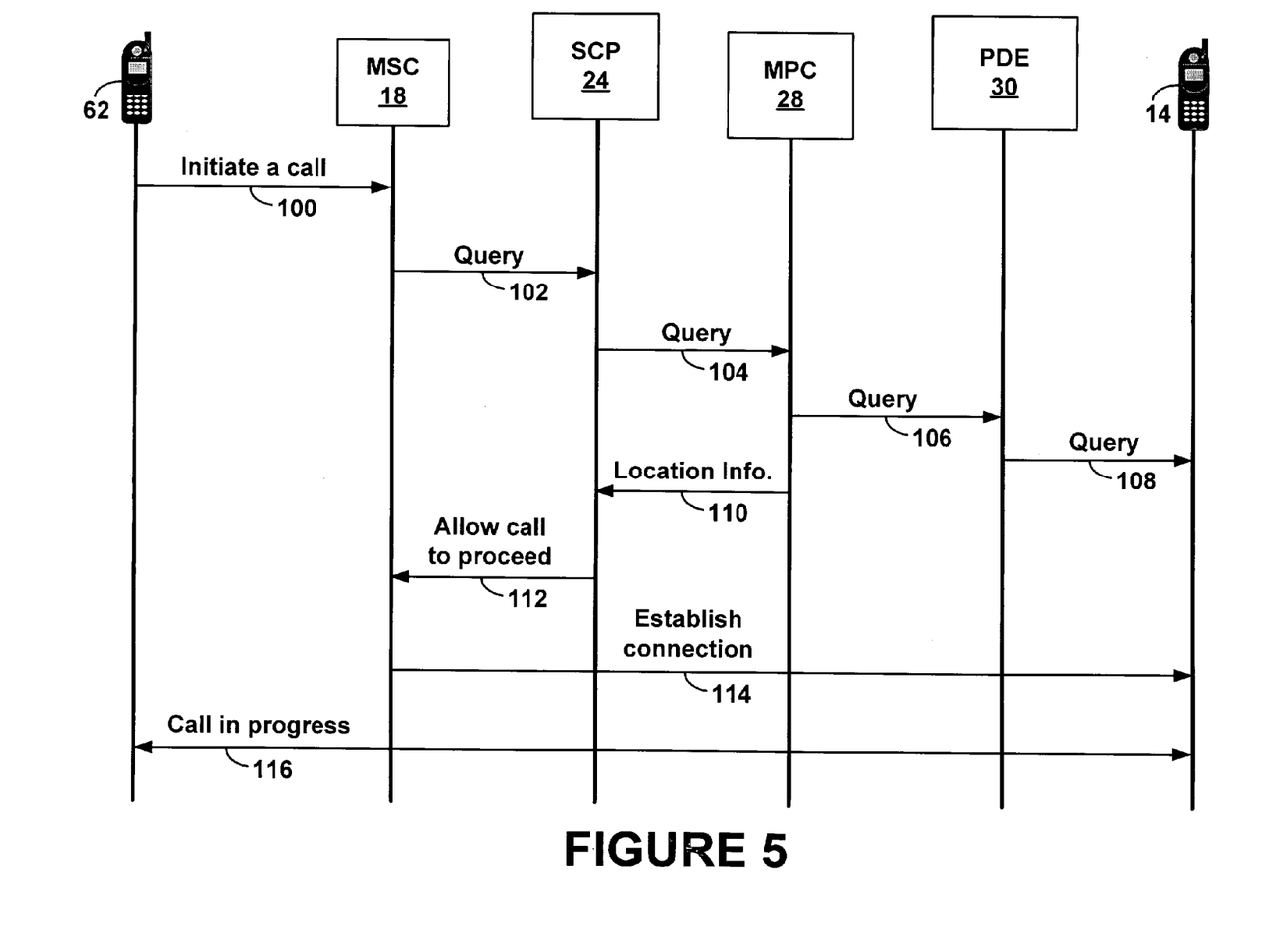
FIG. 5 is a message flow diagram illustrating one example of processing wireless communications within the wireless communication network.

FIG. 5 illustrates one example of processing wireless communications within the wireless communication network 10. Initially, a user of a mobile station 62 may wish to contact a user of the mobile station 14. The mobile station 62 may initiate a call, as shown by message 100, by contacting the MSC 18 through a BTS (not shown). The MSC 18 will then query the SCP 24, as shown by message 102, for call processing assistance. The SCP 24 will then query the MPC 28, as shown by message 104, to determine the altitude of the mobile station 14, and possibly to also determine the position coordinates of the mobile station 14. (The SCP 24 may communicate with the MPC 28 through a location gateway as well.) The MPC 28 will query the PDE 30, as shown by message 106, which determines the altitude and position coordinates of the mobile station 14 by either receiving the coordinates directly from the mobile station 14, as shown by message 108, or by using an assisted GPS method to derive the coordinates of the mobile station 14. In the instance that the mobile station 14 can determine its own altitude information, the MPC 28 may simply query the mobile station 14. (The mobile station 14 can then function as the PDE 30).

The MPC 28 will then receive the location information from the PDE 30 and forward the location information to the SCP 24, as shown by message 110. The SCP 24 then accesses a database (not shown) to determine whether to allow the call to proceed from mobile station 62 to mobile station 14. In this example, suppose mobile station 14 is within the allowable altitude operating range, so, the SCP 24 instructs MSC 18 that the call can proceed, as shown by message 112. The MSC 18 will then establish a connection between the mobile station 62 and mobile station 14, as shown by message 114, possibly through any number of switches or BTSs. The call can then proceed, as shown by message 116, between the mobile stations 62 and 14.

The same set of signaling may be performed to also determine the originating mobile station's altitude (i.e., the altitude of mobile station 62), in addition to or rather than determining the terminating mobile station's altitude.

Figure 6:
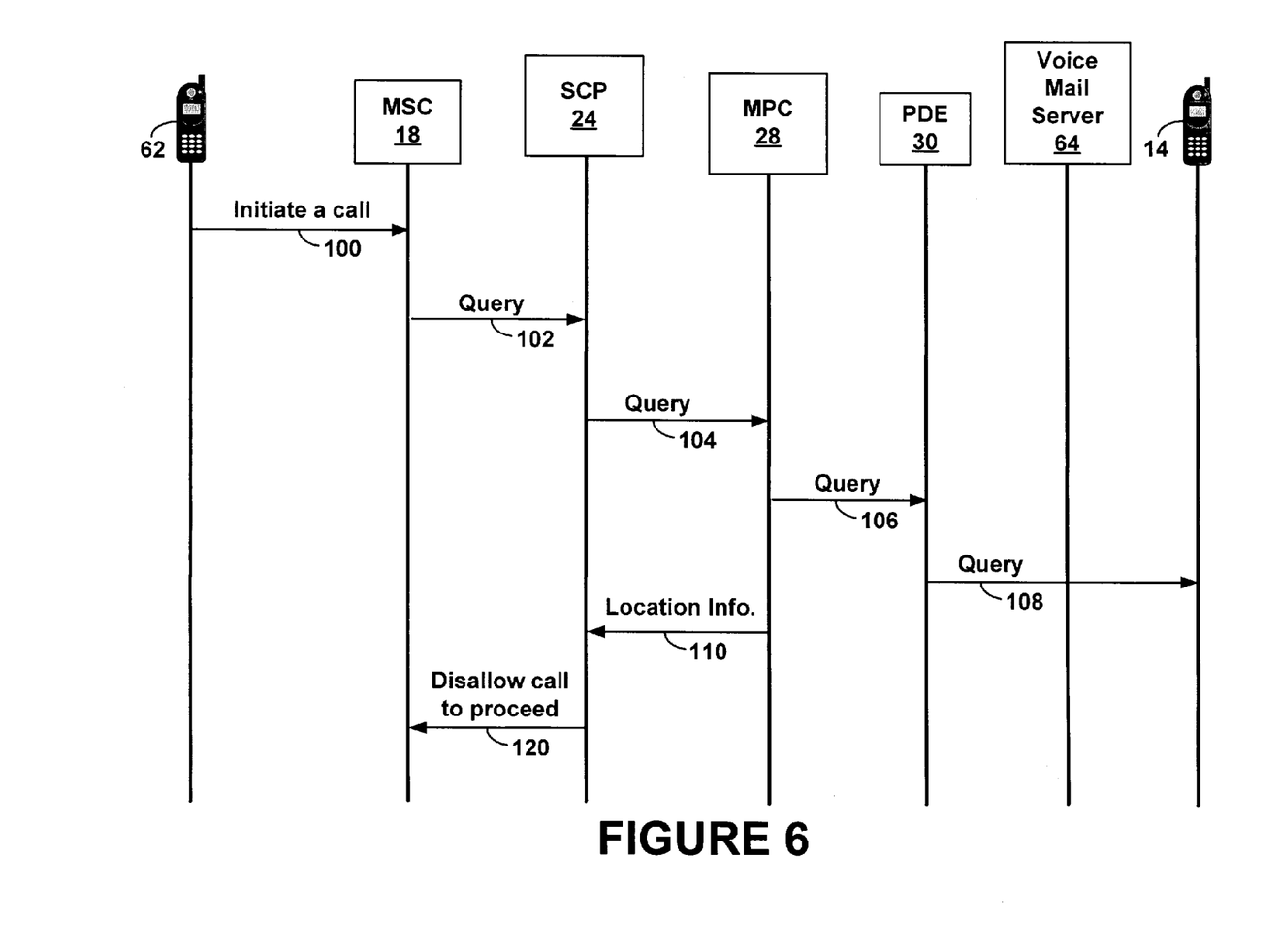
FIG. 6 is a message flow diagram illustrating another example of processing wireless communications within the wireless communication network.

FIG. 6 illustrates another example of controlling wireless communications within the wireless communication network 10. Similar to the example illustrated in FIG. 5, after the SCP 24 receives the location information from the MPC 28, as shown by message 110, the SCP 24 then accesses a database (not shown) to determine whether to allow the call to proceed from mobile station 62 to mobile station 14. In this example, suppose mobile station 14 is not within the allowable altitude operating range, therefore, the SCP 24 instructs the MSC 18 that the call cannot proceed, as shown by message 120. The MSC 18 may then simply not establish the call, and can then return an error message to the mobile station 62.

In an alternate embodiment, the wireless communication network 10 can redirect a call instead of allowing or precluding the requested communication to proceed to the mobile station 14. In this embodiment, if the mobile station 14 is out of the allowable ranges of operating altitudes, then the wireless network 10 may redirect the communication to a voice mail server, for example. The originator of the communication can then leave a voice mail message for the user of the mobile station 14. Alternatively, the communication can be redirected using a call-forwarding mechanism so that the communication is directed to another device that is associated with the user of the mobile station 14. In this manner, the SCP 24 could instruct the MSC 18 to connect the call to the predefined forwarding phone number. Other forms of call redirection are possible as well.

Figure 7:
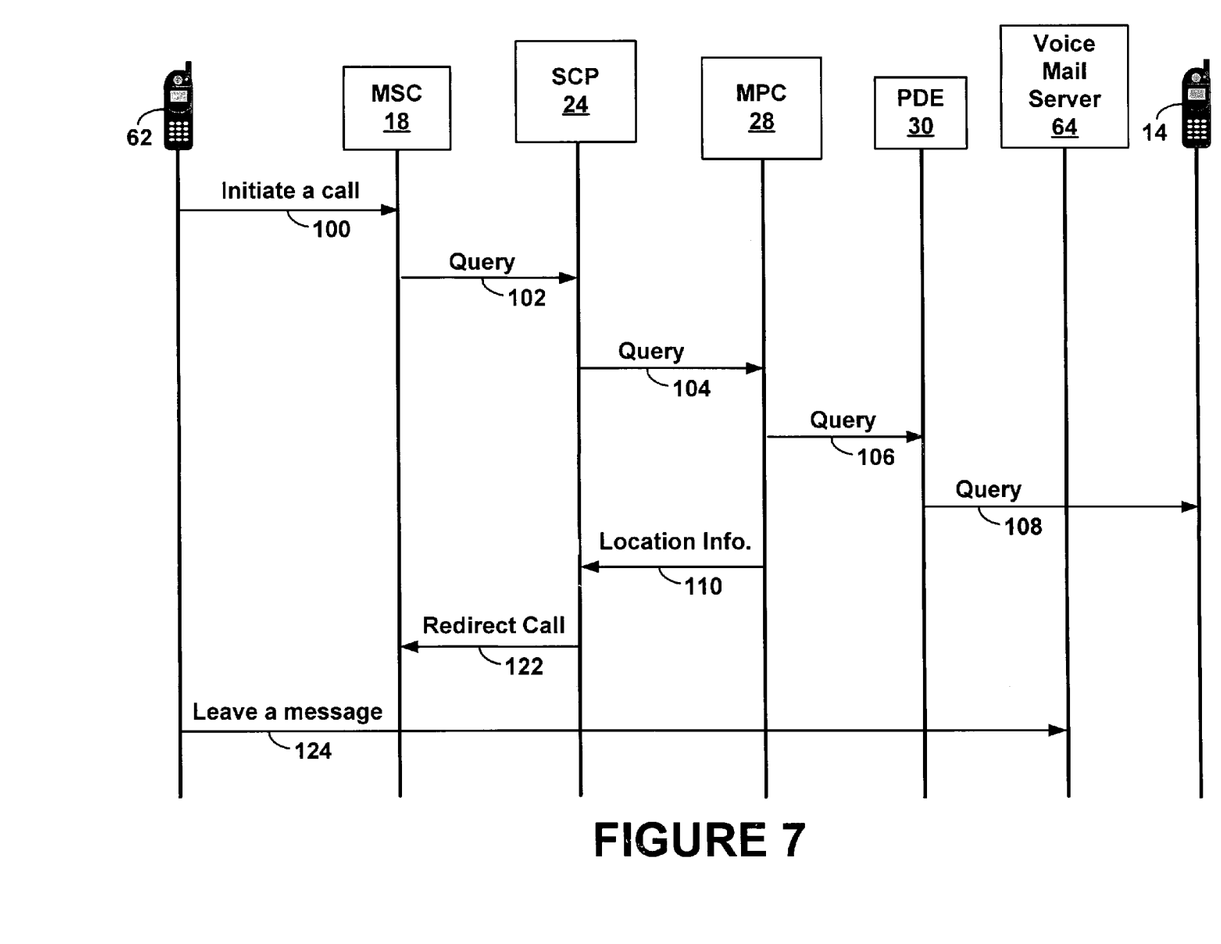
FIG. 7 is a message flow diagram illustrating another example of processing wireless communications within the wireless communication network.

As an example, referring to FIG. 7, suppose that when the SCP 24 accessed the database 50 to determine the allowable altitude levels, the SCP 24 also determined that when the mobile station 14 is out of the allowable altitude levels, calls should be redirected to a voice mail server 64 (which may reside on or be coupled to the signaling network 20). Therefore, the SCP 24 may then instruct the MSC 18 to redirect the call, as shown by message 122. The MSC 18 may then establish a connection between the mobile station 62 and the voice mail server 64 (through the signaling network 20), so that the user of the mobile station 62 can leave a message for the user of the mobile station 14 at the voice mail server 64, as shown by message 124. The user of the mobile station 14 may then access the messages by accessing the voice mail server 64 through a network, such as the PSTN.

In still another example, if the SCP 24, or other entity making the determination, determines that the mobile station 14 is not within the allowable altitude operating range, then instead of precluding the call to proceed or redirecting the call, the SCP 24 could continue to query the MPC 28 to determine when the mobile station 14 enters into the allowable altitude range. An application residing on the SCP 24 can subscribe to receive notification from the MPC 28 when the mobile station reaches a low altitude level. The unestablished call connection could be placed on hold. Then, once the mobile station 14 comes into the allowable altitude range, the MPC 28 could inform the SCP 24, which in turn could inform the MSC 18 to send a message to the mobile station 14 to automatically initiate or resume a data download in order to establish the connection between the mobile station 62 and the mobile station 14. In addition, the SCP 24 may send a WAP Service Indicator message to prompt the user to click on a URL to resume the data download, for example. For a voice call, the application can also send an SMS message to the mobile station 14 informing the user that voice calls are allowed so that the user now may originate calls when the user comes back into the allowable altitude range.

Up to this point, it has been presumed that the decision of whether to allow a communication to proceed is made at the time when a communication is originated, either from the mobile station 14, or from another device and intended to be sent or connected to the mobile station 14. However, the decision of whether to allow a communication to proceed can also be made during a call, or after the establishment of a connection between the mobile station 14 and another device. For example, if a call is in progress between the mobile station 14 and another phone, and the user of the mobile station 14 travels above the allowable altitude level (e.g., the user boards a plane that departs), then the call may need to be disconnected, according to allowable altitude guidelines.

Figure 8:
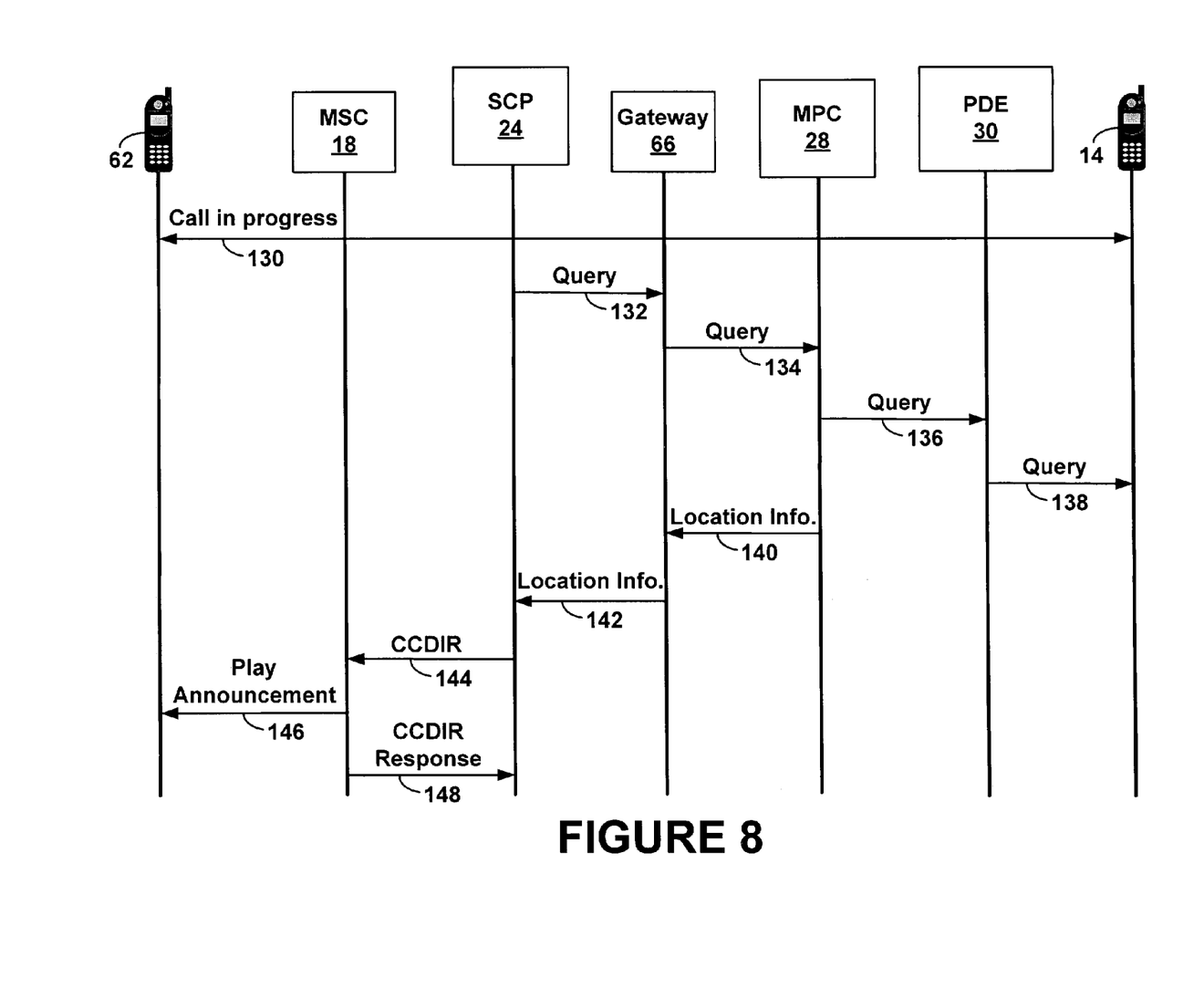
FIG. 8 is a message flow diagram illustrating an example of processing wireless communications within the wireless communication network after a connection between a mobile station and another device has been established.

FIG. 8 illustrates an example of controlling wireless communications within the wireless communication network 10 after a connection between the mobile station 14 and the mobile station 62 has already been established. Unlike the examples illustrated in FIGS. 5 and 6, here a call has been established between the mobile station 62 and 14, as shown by message 130. The SCP 24, or other entity making the decision of whether to allow the call to proceed, can then monitor the altitude of the mobile station 14, possibly by subscribing to receive the mobile station's altitude from the MPC 28, as shown by message 132, via a location or parlay gateway 66. For a parlay gateway implementation, for example, a triggeredLocationReport message, as defined in the "Application Programming Interface (API) Part 6: Mobility SCF," published by the European Telecommunications Standard Institute (ETSI) Parlay Group, V0.0.4 2003, could be used. For this implementation, the parlay SCF (Service Capability Feature) would poll the mobile station's location by continuously, repeatedly or periodically (e.g., every five minutes) sending a query, as shown by message 134, to the MPC 28. In turn, the MPC 28 signals the PDE 30, as shown by message 136, and the PDE 30 queries the mobile station 14 to determine its altitude information, as shown by message 138. The MPC 28 will return location information, including the mobile station's altitude, to the gateway 66, as shown by message 140.

When the altitude exceeds an allowable level, an event from the gateway 66 will trigger (e.g., notify) an application on the SCP 24, as shown by message 142, and the application can send a CallControlDIRective (CCDIR) message 144, as defined in IS-826, to the MSC 18 to instruct the MSC 18 to disconnect the call. The application on the SCP 24 can also inform the MSC 18 to instruct the mobile station 62 to play an announcement before disconnecting the call, as shown by message 146. The MSC 18 will send a CCDIR response message 148 to the SCP 24 acknowledging the message 144.

Processing Communication Requests Based on Additional Factors

The SCP 24, or other entity making the decision, may prohibit a call from proceeding, and thus limit the mobile stations usage, if the mobile station's current altitude is above, below, or possibly within a range of altitudes. For some situations, it may also be desirable to prohibit mobile station usage based also on the mobile station's position. Therefore, an SCP can also take into consideration other factors in addition to the altitude of the mobile station 14, in deciding whether to allow a requested communication to proceed. For instance, the SCP 24 can consider latitude and longitude coordinates of the mobile station 14 as well as the altitude of the mobile station 14. Other examples are possible as well.

Using the position of a mobile station in addition to the altitude of a mobile station may be useful in many situations. For example, while it might be desirable to disable the mobile station 14 while in flight on an airplane, it might also be desirable to disable the mobile station 14 while the airplane is on the ground just before take-off or during take-off, and just before landing or during landing. This may limit interference with the sensitive electronic equipment in the airplane that is in use during take-off/landing of the airplane. Therefore, when the SCP 24 queries the MPC 28 to determine the mobile stations current altitude, the MPC 28 can also determine the mobile station's current latitude and longitude. The SCP 24 may then decide whether to allow the call to proceed based on the mobile stations altitude, and latitude and longitude coordinates, e.g., based on whether the mobile station 14 is close to an airport and within a range of altitudes indicating that the airplane is taking off or landing.

As another example, the SCP 24 may preclude origination or termination of a call from or to the mobile station 14 if the mobile station 14 is on a certain floor of a building. It may be desirable to disable cell phone usage on a floor of a building, e.g., at a particular location, and at a particular altitude. For example, use of cell phones is typically prohibited in a casino. If the casino is located on a floor of a building, then the location and altitude of the casino could be determined, and cell phone usage within the casino could be prohibited.

The database 50 may contain the latitude and longitude coordinates of locations where mobile station usage is prohibited. The SCP 24, or other entity making the decision, can then access the database 50 to apply these guidelines, in addition to the altitude guidelines, to determine whether to allow a call to proceed. The SCP 24 may apply the location guidelines to) all mobile stations, for example. Alternatively, the database 50 may include information pertaining to individual mobile stations, indicating the latitudes and longitudes in addition to altitudes that those mobile stations may operate, to disable certain types of mobile stations at certain locations, for example. Other examples are possible as well.

Prohibiting mobile stations from receiving or originating calls while the mobile stations are out of a predetermined altitude range will not cause a large inconvenience. To provide safety in some situations, and to more effectively operate a wireless communication network, some mobile stations will be inoperable for the time that they are out of the predetermined range of altitudes. However, many mobile station users will benefit since the wireless communication network will operate as designed. Also, in some situations, as in cell phone bans on airplanes, the foregoing techniques allow a wireless communication network to conform to and enforce FAA rules and regulations, for example.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method for processing wireless communications comprising:
   receiving a request to connect a communication for a mobile station;
   determining the mobile station's altitude; and
   based at least in part on the mobile station's altitude, processing the request to decide whether to allow the communication to proceed.

2. The method of claim 1, wherein receiving a request to connect a communication for a mobile station comprises receiving a request to connect a communication to the mobile station.

3. The method of claim 2, wherein processing the request comprises redirecting the communication if the communication is prohibited from proceeding.

4. The method of claim 1, wherein receiving a request to connect a communication for a mobile station comprises receiving a request to connect a communication from the mobile station to another device.

5. The method of claim 1, wherein determining the mobile station's altitude comprises acquiring a GPS reading of the mobile station's current altitude.

6. The method of claim 1, wherein determining the mobile station's altitude comprises determining the mobile station's altitude based at least in part on information provided by the mobile station.

7. The method of claim 1, wherein determining the mobile station's altitude comprises querying a location-determination system to determine the mobile station's altitude.

8. The method of claim 1, wherein processing the request comprises accessing a database to determine altitude levels at which mobile station call placement and call receipt is prohibited from use.

9. The method of claim 1, wherein if the mobile station's altitude is greater than a predetermined threshold level, then prohibiting the communication from proceeding.

10. The method of claim 1, wherein if the mobile station's altitude is less than a predetermined threshold level, then permitting the communication to proceed.

11. The method of claim 1, further comprising determining the mobile station's location, including an indication of the mobile station's latitude and longitude coordinates.

12. The method of claim 11, further comprising processing the request based at least in part on the mobile station's location in addition to the mobile station's altitude.

13. The method of claim 1, wherein if the mobile station's altitude is within allowable altitude levels, then permitting the communication to proceed.

14. The method of claim 13, wherein determining the mobile station's altitude comprises repeatedly querying a location-determination system to determine when the mobile station enters the allowable altitude levels, and then allowing the requested communication to proceed.

15. A method for processing wireless communications after establishing a connection between a mobile station and a device, the method comprising:
    determining the mobile station's altitude; and
    based at least in part on the mobile station's altitude, deciding whether to maintain the connection between the mobile station and the device.

16. The method of claim 15, wherein determining the mobile station's altitude comprises continually acquiring a GPS reading of the mobile station's altitude.

17. The method of claim 15, further comprising:
    periodically acquiring a GPS reading of the mobile station's altitude; and
    periodically deciding whether to maintain the connection between the mobile station and the device.

18. The method of claim 15, further comprising:
    periodically querying a location-determination system to determine the mobile station's altitude; and
    periodically deciding whether to maintain the connection between the mobile station and the device.

19. The method of claim 15, further comprising, if the mobile station is not within an allowable altitude range, then disconnecting the connection between the mobile station and the device.

20. An entity for processing wireless communications comprising:
    service logic being operable to receive information at least in part indicative of a mobile station's altitude;
    a processor being operable to process a request to connect a communication for the mobile station based at least in part on the mobile station's altitude; and
    a database that includes information indicating altitude levels in which the entity allows the requested communication for the mobile station to proceed.

21. The invention of claim 20, wherein based on the mobile station's altitude, the entity decides whether to allow the requested communication for the mobile station to proceed.

22. The invention of claim 20, wherein the entity is selected from the group consisting of a mobile switching center (MSC), a service control point (SCP), and the mobile station.

23. The invention of claim 20, wherein if the mobile station is not within an allowable range of altitudes, then the entity prohibits the requested communication for the mobile station from proceeding.

24. The invention of claim 20, wherein the entity redirects the requested communication for the mobile station to a voice mail server if the mobile station is not within an allowable range of altitudes.

25. The invention of claim 20, wherein the service logic is also operable to receive information indicative of the mobile station's location, including an indication of the mobile station's latitude and longitude coordinates, and the processor decides whether to allow the requested communication for the mobile station to proceed based at least in part on the mobile station's location in addition to the mobile station's altitude.

* * * * *